United States Patent [19]

Olsen et al.

[11] Patent Number: 4,963,700
[45] Date of Patent: Oct. 16, 1990

[54] CLOSURE ARRANGEMENTS FOR ELECTRICAL SPLICES

[75] Inventors: Arnold T. Olsen, Austin; John S. Young, Leander, both of Tex.

[73] Assignee: Minnesota Mining and Manufacturing Company, St. Paul, Minn.

[21] Appl. No.: 341,760

[22] Filed: Apr. 26, 1989

[51] Int. Cl.$^5$ .................. H01R 4/70; H02G 15/113
[52] U.S. Cl. ..................... 174/138 F; 174/92
[58] Field of Search .......... 174/92, 138 F; 439/521; 156/49; 220/339

[56] References Cited

U.S. PATENT DOCUMENTS

| | | | |
|---|---|---|---|
| 3,147,338 | 9/1964 | Ekvall et al. | 174/92 X |
| 3,484,541 | 12/1969 | Campbell | 174/92 X |
| 3,624,270 | 11/1971 | Turner | 174/138 F X |
| 3,757,031 | 9/1973 | Izraeli | 174/92 X |
| 4,127,189 | 11/1978 | Shumrak et al. | 220/339 X |
| 4,435,612 | 3/1984 | Smith | 174/92 |
| 4,550,220 | 10/1985 | Kitchens | 174/92 X |
| 4,849,580 | 7/1989 | Reuter | 174/92 |

FOREIGN PATENT DOCUMENTS 117776 5/1930 Austria .................. 174/92

Primary Examiner—Laramie E. Askin
Attorney, Agent, or Firm—Merchant, Gould, Smith, Edell, Welter & Schmidt

[57] ABSTRACT

A closure for use in providing an environmental seal about a wire junction. The closure comprises a closable shell defining, when closed, an internal wire junction receiving chamber having first and second opposite open ends, for receipt of wires therethrough. The shell comprises first and second shell sections, and an interference fit locking arrangement oriented between the shell sections. In one embodiment, the shell sections are unitary, i.e. they are joined along a hinge line. In an alternate embodiment, the shell sections are independent of one another, but engageable in a nesting manner. The interference locking mechanism preferably comprises a plurality of elongate, continuous, interengageable rachet teeth. In use, sealant material is positioned within the shell sections, and a junction to be sealed is enclosed therein.

3 Claims, 3 Drawing Sheets

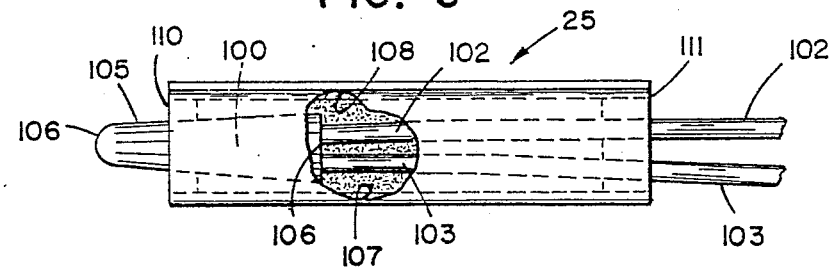
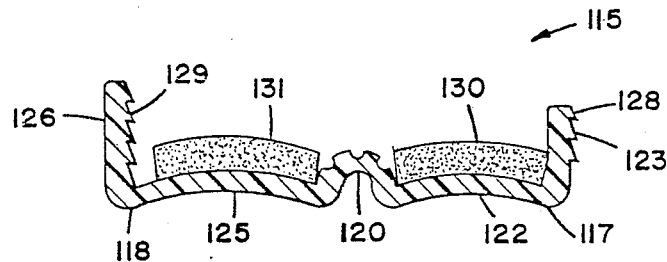
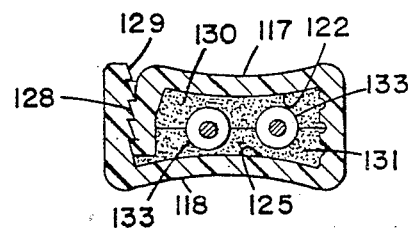
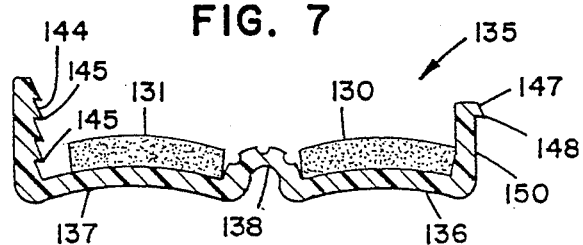
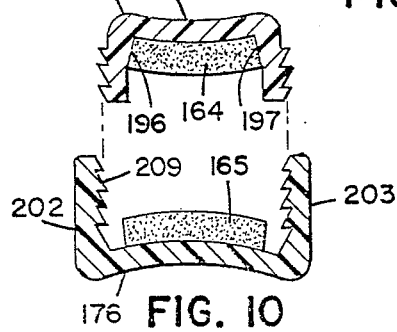
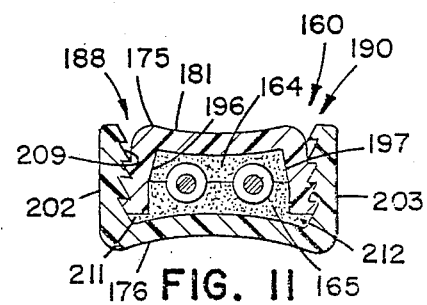

CLOSURE ARRANGEMENTS FOR ELECTRICAL SPLICES

FIELD OF THE INVENTION

The present invention relates to environmental seals for electrical connections. The invention particularly concerns closures which can be selectively placed around an electrical connection in a preferred manner to generate an effective, water-resistant, environmental seal.

BACKGROUND OF THE INVENTION

Junctions or splices involving electrical wiring generally should be sealed for protection against exposure to the elements, particularly moisture: for inhibition of deterioration from corrosion; to reduce the likelihood of an electrical short or the like; and, to enhance performance of the electrical system of concern. Generally, the junctions involve at least two, and often four or more, insulated wires brought together and exposed at a particular site of connection. The junctions may a variety of types including: connections having wires brought together from opposite directions, or a plurality of directions; and, pig-tail connections wherein the wires are generally directed toward the site of connection from a single direction. Generally, maintenance of a secure, conductive, connection and the point or points of engagement is facilitated through use of mechanical means such as by clamping, and/or with the use of welds or points of soldering. In the case of pig-tail connections, coil or spring-type caps may also be used to facilitate connection.

As previously indicated, generally connection involves exposure of conductive wire portions, from a plurality of extensions of insulated wire. The exposed portions, after the connection is made, should be protected from the environment, especially moisture. Numerous seals and seal methods for accommodating this have been developed. They include: wrapping the connection in insulating tape; molding a protective plug around the connection; sealing the connection with a heat shrink tubing adhesive arrangement; and, sealing the connection within or between sheets or layers of materials. In addition, closure arrangements have been developed.

Assembled devices such as automobiles, trucks, construction equipment, marine vehicles, mobile homes, generators, pump systems, construction machinery or the like may include a great many wire splices therein, at least some of which are environmentally sealed during assembly or manufacture. There has been some need for improvement in the design of such seals, to facilitate installation and enhance insulation and protection. Also, generally, through the life time of such devices, it may be necessary for maintenance or repair persons, mechanics etc. to gain access to the sealed splices. Typically, to accomplish this the worker removes factory-installed environmental seals, to work on the junction. After the maintenance process, generally the environmental seal must be replaced.

Many factory-installed environmental seals cannot be readily re-installed once removed. That is, often the removal process involves the destruction of the seal. Thus, the maintenance person is in a position of having to install a new environmental seal about the electrical junction.

Since the junction is, at the point of maintenance, typically positioned within a fully or nearly fully-assembled vehicle, piece of machinery or the like, the junction sometimes cannot be readily sealed via factory techniques. A reason for this is that factory techniques may involve complex or large assembly equipment that require access to a significantly disassembled unit. That is, often the junction is located at a difficult to access area in the assembled device. This can be a particular problem if significant equipment is needed to form the junction seal. Further, the mechanic may not have the special tools to construct factory seals.

As a result, the maintenance person generally must install any environmental seal, to be applied, by hand or with hand tools. In the past, this has typically been done either by wrapping the junction with insulating tape or the like, or enclosing the junction within some form of seal-closure or casing.

It is noted that there may be other instances in which exposed electrical components need to be environmentally protected. For example, a splice might be created in a field. For such situations, problems analogous to those discussed for factory-created splices have occurred.

Even with factory seals, there has been need for improvement. In particular, some factory seals can be difficult to break, when necessary for maintenance in the field. Further, some can be relatively difficult to install.

Electrical tape, while it provides fairly good electrical insulation, does not provide a particularly desirable environmental seal. A reason for this is that if tape is used on two or more substantially adjacent wires, the tape provides for no significant sealing in the area between the wires. That is, moisture and the like can invade the area of the junction by passage between adjacent wires.

Closure or casing arrangements have been somewhat more successful. However, many conventional arrangements have not been fully acceptable, for a variety of reasons including at least those described below.

The closure, for example, should be such as to facilitate relatively easy application, even in hard to reach locations. Some conventional arrangements have been relatively complex in design. These may be subject to problems of handling, during installation. Further, they may be difficult to orient properly, in use.

Secondly, many arrangements have not provided a desireable seal between adjacent wires, especially when used with arrangements involving 3, 4 or more wires. That is, some conventional arrangements seal fairly well when utilized on only a two-wire junction, for example those formed between two oppositely directed wires. However, with more complicated arrangements, conventional devices have in many instances not provided very good seals between substantially adjacent wires.

Further, many conventional arrangements have not handled multi-wire pig tail arrangements very well. A major problem relating to this is the same as above-described. That is, sealing with respect to substantially adjacent wires has not been well-effected in some arrangements.

It is also desirable that the closure be such as can be relatively easily installed on the wire, and retained in place. It is specifically desirable to provide a locking mechanism on the closure which will ensure retention of the seal. Further, relatively simple constructions are desirable as they can be easily manufactured and will be relatively inexpensive to prepare and use. Also, relatively universal constructions, which can be used on a variety of types and sizes of junctions, will be preferred, for convenience.

What has been needed has been an environmental protection closure for electrical junctions and the like a preferred form of which addresses the above concerns, with respect to both factory installation and field installation. In addition, a method for providing an effective environmental seal about an electrical junction and the like has been needed. What has been particularly needed has been a preferred arrangement and method well adapted for providing a good environmental seal about a multi-wire arrangement, involving a plurality of substantially parallel, or substantially adjacent, wires.

SUMMARY OF THE INVENTION

According to the present invention a shell, closure construction or assembly is provided to facilitate provision of an environmental seal about a multi-wire splice or junction. The arrangement is particularly well adapted for protecting junctions formed from wires some of which extend to the junction in a manner substantially parallel to one another. It is noted that the device can also be used to provide effective sealing around other types of exposed electrical conductors or components, by operation in a manner analogous to that described.

The shell has a first shell section and a second shell section. The shell sections are adapted to engage one another, when the shell is closed, to form an internal wire junction receiving chamber having first and second opposite open ends.

An environmental seal about an enclosed splice is provided by means of sealing material received within the enclosure. As the closure arrangement is closed, the sealing material is forced against and around the wire junction. Pressure associated with this process generally operates: to force sealant between adjacent wires and generate a good environmental seal therebetween; to provide appropriately directed pressure to means clasping, latching or locking the closure shut, and help maintain closure; and, to press the sealant fields against one another. Also, the sealant material will act as an adhesive, to maintain a closed orientation for the arrangement.

According to the invention, the closable shell is provided with at least a first interference fit locking arrangement. The locking arrangement provides for engagement between the two shell sections, to maintain closure. The interference fit locking arrangement includes first and second interlocking members, oriented on the shell sections. The first interlocking member is oriented on an outside or external wall portion of one of the shell sections; and, the second interlocking member is oriented on an inside or internal wall portion of the other shell section. Preferably the interlocking members including elongate rachet members, engageable with one another to perform multiple-position locking. The preferred ratchet members include a plurality of ridges having a preferred profile to facilitate engagement and inhibit later disengagement. In particular, each ridge has a slanted wall, which faces outwardly from the shell section, and a sharp projecting or perpendicular wall, which faces inwardly. As the arrangement is closed, ridges on the two shell sections interlock. The slanted shapes of the ridge walls facilitate slip of the two shell sections relative to one another in a direction of closure. The mating of the sharply projecting walls, however, inhibits reverse movement, i.e. opening. In preferred embodiments, the features of the ridges are longitudinally continuous; i.e. they extend completely along the closure from one end to another. Thus, sealing completely along a seam between the two sections is facilitated; and, manufacture by either extrusion or various molding processes is made more simple.

In certain preferred embodiments, each longitudinal surface has a convex cross section, such that the surfaces bow or project toward one another, when the shell is closed. This bowing tends to maintain hydraulic forces on the enclosed sealant material, forcing wires of an enclosed junction apart and enhancing the sealing effect.

In a two-piece construction, each shell section comprises an elongate trough member having a central longitudinal surface, and first and second opposite sidewalls. The trough members are engageable with one another to form the closed shell. Preferably, the two-piece arrangement includes first and second interference fit locking arrangements. Preferably, each locking arrangement operates along a sidewall of one of the trough members, to provide for locking engagement. In a preferred embodiment, one of the trough members can be nested in the other, for preferred sealing arrangement. Preferably both interference fit locking arrangements comprise interlocking members which include ratchet members having a plurality of ridges.

In one preferred manufacturing method, the shell sections (whether unitary or separate) are manufactured through an extrusion process into strips. Short, spaced, extensions of sealant material are applied to the elongate strips, on appropriate surfaces of the shell sections. Extensions of protective liner or slip cover are then applied over the sealant fields. Each closure is then manufactured, by cutting through the liner and strips of shell section, in spaces between the sealant fields.

Preferably the sealant is a relatively viscous material. Relatively high viscosity sealant, in use with closures according to the present invention, will tend to be forced into areas between adjacent wires, but due to its viscosity will not substantially flow outwardly from open ends of the closure.

An alternate manner of identifying sealant usable according to the present invention, rather than by viscosity directly, is by cone penetration value. If the cone penetration value is relatively low, the material is thick and viscous. Cone penetration values are measured according to procedures outlined in ASTM D217-82 (IP designation 50-69 (79)).

BRIEF DESCRIPTION OF THE DRAWINGS

FIG. 5 is a top plan view of an enclosure analogous to that shown in FIG. 2, but illustrated in operative combination with a two-wire pig-tail type arrangement; portions being broken away to show internal features, and phantom lines depicting other internal features.

FIG. 6 is a cross-sectional view of a first alternate embodiment of a closure according to the present invention.

FIG. 7 is a depiction of the arrangement shown in FIG. 6, oriented in an operationally closed configuration, with sealant material and a two-wire junction enclosed therein.

FIG. 8 is a depiction of a second alternate embodiment of the present invention, generally analogous to FIG. 6.

FIG. 10 is a cross-sectional view of the closure of FIG. 9 showing the closure in an open position and, for clarity of illustration, having the wire junction removed.

FIG. 11 is a cross-sectional view taken generally along line 11—11, FIG. 9; FIG. 11 depicting the arrangement in a non-exploded manner.

DETAILED DESCRIPTION OF THE INVENTION

The present invention generally concerns a closure arrangement for providing an environmental seal about electrical junctions, electrical components or the like. While the closure may be used to enclose a variety of arrangements to be protected, it is generally described with respect to wire splices, the principal foreseen application. Two major embodiments are described herein. The major embodiments differ in that the first described is a unitary or one-piece construction, and the second described is a two-piece construction. Certain alternate arrangements for each major embodiment are described and shown.

Both major embodiments have advantages, in certain applications. Initially, detailed descriptions are provided concerning the closure construction or physical arrangement of sealant, for the two embodiments. Following these descriptions, detail concerning usable sealant(s) is provided. Also, a convenient method for preparing the arrangements is described.

THE EMBODIMENT OF FIGS. 1-4

Figure 1:
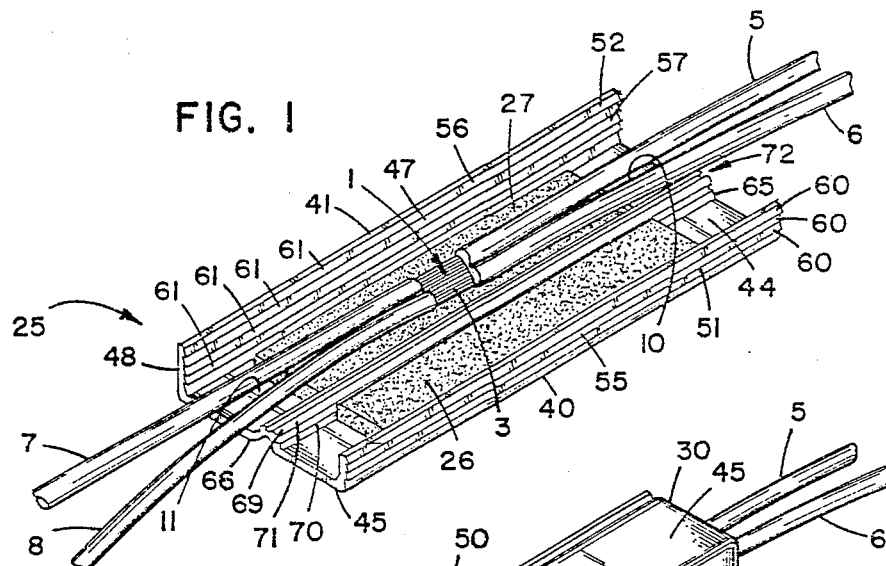
FIG. 1 is a perspective view of an environmental closure according to the present invention shown in an open orientation, with two fields of sealant and a four-wire junction operationally positioned thereon; the wire junction being shown in fragmentary prospective.

The reference numeral 1, FIG. 1, indicates an electrical connection or junction such as is to be provided with an environmental seal, according to the devices and methods of the present invention. The junction 1, FIG. 1, is shown schematically and comprises a point 3 whereat four insulated wires 5, 6, 7, and 8, are spliced to one another. It will be understood that the four-wire arrangement of FIG. 1 is intended to merely be exemplary of splices or other electrical components which can be protected according to the present invention. For example, splices involving a variety of numbers of wires, approaching connection points from various directions, may be sealed. Also, components not comprising splices could be enclosed.

Generally, the splices of primary concern to the present invention involve wires which are brought into the point of connection in manners either substantially opposite to one another, or substantially adjacent to one another. This is illustrated in FIG. 1. In particular, wires 5 and 6 are brought to the junction 1 in a manner substantially adjacent to one another, i.e. substantially parallel to one another. Wires 7 and 8 on the other hand, are directed into junction 1 in a manner substantially adjacent one another, but generally in extension opposite to the direction of wires 5 and 6. Thus, an overall elongate system is provided.

It will be understood that closures according to the present invention are also well adapted for use in association with pig-tail splices, i.e. splices in which the wires extend from one primary direction. This is illustrated in FIG. 5, and is described in further detail below.

Junction point 3 involves an area of exposure of insulated wires 5, 6, 7, and 8. Secure, electrically conductive, contact between the wires of point 3 can be provided by a variety of means, including mechanical means such as with crimping or crimping devices, and/or with means such as welding or soldering. A purpose of the present invention is to provide for an environmental seal about junction 1. A particular problem in providing environmental seals about junctions such as junction 1 is that of providing a good seal between adjacent wires; for example, in space 10 between wires 5 and 6, or in space 11 between wires 7 and 8. A manner in which this is accomplished via the present invention and preferred devices for accomplishing this are described in detail below.

In FIG. 1, a closure, closable shell or closure arrangement 25 according to a preferred embodiment of the present invention is illustrated. In FIG. 1, closure arrangement 25 is shown as it would appear with viscous sealant fields 26 and 27 operationally positioned therein. Further, the arrangement 25 is shown depicted during a step of assembly about junction 1. The arrangement 25, FIG. 1, is depicted in an "open" orientation; i.e. an orientation prior to closure about junction 1.

Figure 2:
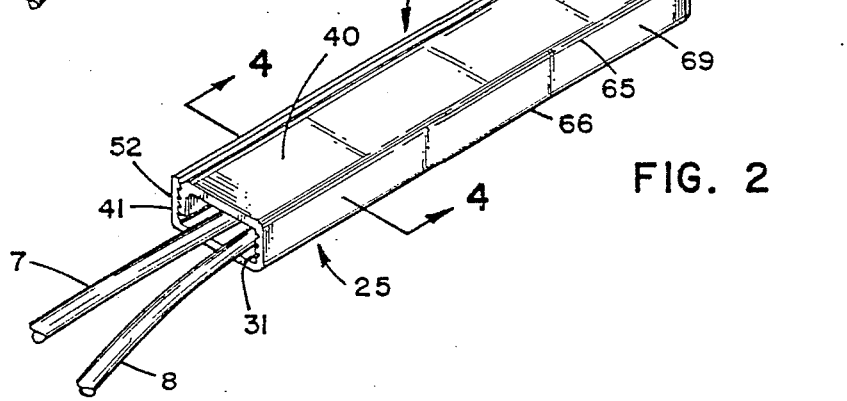
FIG. 2 is a perspective view of the arrangement shown in FIG. 1, depicted in an operational and closed orientation.

In FIG. 2, closure arrangement 25 is depicted in a closed orientation, about the wire junction. Wires 5, 6, 7, and 8 are viewable projecting outwardly from ends of a closed arrangement 25. In particular, wires 5 and 6 extend outwardly from a first open end 30, and wires 7 and 8 extend outwardly from a second opposite open end 31.

Figure 4:
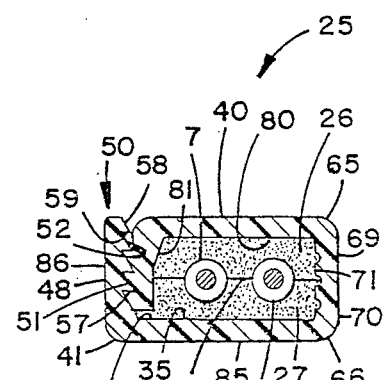
FIG. 4 is a cross-sectional view taken generally along line 4—4, FIG. 2.

Referring to FIG. 4, operation of the assembly 25 to generate a good environmental seal will be understood. In particular, insulated wires 7 and 8 are shown compressed between sealant fields 26 and 27. Due to hydraulic pressures built up in interior 35 of the arrangement 25, sealant material from fields 26 and 27 has been forced between insulated wires 7 and 8. Each wire, 7 and 8, therefore, is substantially completely surrounded by sealant material. This generally prevents creep of moisture up along gap 11 between the wires 7 and 8, and toward the exposed junction 1. It is noted that the hydraulic pressures within the sealant fields 26 and 27, during closure, facilitate wire spreading and sealing.

The assembly 25 depicted in FIGS. 1 through 4 is of unitary construction, comprising first and second shell sections 40 and 41 respectively. Referring to FIG. 1, shell section 40 includes internal and external wall surfaces or portions 44 and 45 respectively; and, shell section 41 includes internal and external wall surfaces or portions 47 and 48 respectively.

Figure 3:
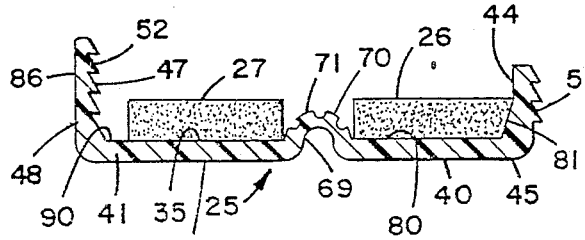
FIG. 3 is a cross-sectional view of the closure of FIG. 1 with the four-wire junction removed for clarity.

Assembly 25 includes a first interference fit locking arrangement 50, FIG. 4, which includes first and second interlocking members, 51 and 52 respectively (shown best in FIGS. 3 and 4). The first interlocking member 51 is oriented on the external wall portion 45 of first shell section 40; and, the second interlocking member 52 is oriented on the internal wall portion 47 of shell section 41. Thus, when assembly 25 is closed, FIG. 3, the interference fit locking arrangement 50 is oriented, for operation, between the two shell sections 40 and 41 respectively. As a result, hydraulic forces generated by the sealant fields 26 and 27, FIG. 4, when assembly 25 is closed, will tend to pressurize locking arrangement 50, forcing first and second interlocking members 51 and 52 toward one another, for secure engagement. This is facilitated by providing a construction or assembly 25 in which the sidewalls 45 and 47 are somewhat flexible. This secure engagement is further facilitated by means described below.

Preferably, the first and second interlocking members 51 and 52 include first and second elongate rachet members 55 and 56 respectively. Ratchet members 55 and 56 engage one another, by means of elongate teeth 57, FIG. 1. Each elongate tooth 57 projects, in cross section FIGS. 3 and 4, with one slanted wall 58 extending inwardly from the wall portion 47 and away from the free edge of the wall portion and one transverse or sharply projecting wall 59. Thus, the two ratchet members 55 and 56 can readily slide past one another during closure, but resist opening. Alternately stated, the slanted walls 58 on each of ratchet members 55 and 56 project outwardly from the associated shell sections, 40 and 41 respectively. During closure, the slanted walls 58 of the two shell sections 40 and 41 are brought into engagement with one another. The slanted walls 58 allow the shell sections 40 and 41 to slide or slip partially past one another, into multiple positions of locking engagement. The transverse or sharply projecting walls 59 restrict or inhibit reverse movement, i.e. opening.

Preferably each rachet member includes a plurality of elongate longitudinal teeth or ridges. For example, FIG. 1, rachet 55 includes three parallel, elongate tooth members 60; and, rachet 56 includes 4 elongate longitudinal, substantially parallel tooth members 61. Preferably, each of the tooth members 60 and 61 includes one sloping wall 58 for sliding engagement during closing, and a straight rachet-type wall 59, for restricting or inhibiting unlocking. With respect to this, attention is directed to FIG. 4, which shows engagement between the various rachet members or tooth members.

Preferably, each tooth member 60 and 61 is longitudinally continuous. That is, each extends continuously between opposite ends 30 and 31 of assembly 25. This facilitates closure and seal. Also, such an arrangement can be readily manufactured by either extrusion or molding techniques.

Still referring to FIGS. 1 through 4, shell section 40 includes an elongate side edge portion 65; and, shell section 41 includes an elongate side edge portion 66. The edge portions 65 and 66 are oriented in alignment with one another, by means of an elongate hinge member 69, FIG. 1. The hinged association of shell members 40 and 41 facilitates movement between open and closed orientations; see and compare FIGS. 1 and 2.

Preferably elongate hinge 69 is a ribbed hinge 70. That is, hinge 69 includes a plurality of elongate ribs 71 therein. The ribs 71, FIGS. 3 and 4, result from an alternating longitudinal rib/trough arrangement 72, in hinge 69. The troughs between the ribs facilitate movement of the shell sections 40 and 41 about the hinge 69, and closure of assembly 25. The ribs 71 impart transverse strength. Referring to FIG. 1, it will be understood that if assembly 25 is manufactured from a material such as a polyvinyl or polypropylene resin or the like, using an extrusion process, it can be readily formed with rib/trough arrangement 72 therein. That is, the features of arrangement 72 are generally parallel, longitudinal and continuous.

Still referring to the embodiment of FIGS. 1 through 4, preferably each of shell sections 40 and 41 has a generally "L" shaped cross-section, with the two sections 40 and 41 being joined at hinge 69. More specifically, FIG. 4, section 40 includes extension 80 and sidewall 81; and, section 41 includes extension 85 and sidewall 86.

Referring to FIGS. 3 and 4, the first interlocking member 51 is generally oriented on an exterior of sidewall 81; and, the second interlocking member 52 is generally oriented on sidewall 86.

While not absolutely necessary to practice the full scope of the present invention, to facilitate closure, it is preferred that sealant field 27 is oriented on surface 35 such that a side gap 90 is left between the sealant field 27 and sidewall 86. The gap 90 should be of sufficient size to permit sidewall 81 to extend or project thereinto, during closure. Preferably the gap 90 is sized such as to facilitate a snug fit for sidewall 81, between the sealant field 27 and sidewall 86. In this manner, substantial hydraulic forces will build up in the sealant fields 26 and 27 during closure, ensuring a good seal and substantial pressure against interference fit locking arrangement 50, maintaining closure.

In FIG. 5, assembly 25 is shown in an operational, closed, orientation in association with a pig-tail splice arrangement 100. Pig-tail splice arrangement 100 comprises first and second wires 102 and 103 brought together by extension from one direction. The wires 102 and 103 are provided in electrical contact with one another by a connector 105. Connector 105 may be of any of a variety of conventional manufactures, including an arrangement having an insulative outer shield or cap 106, with an internal clamping spring or coil, not shown, therein. Electrical connection between wires 102 and 103 can be readily facilitated by merely turning or screwing the insulative cap and spring onto exposed ends, not shown, thereof.

In FIG. 5, assembly 25 is shown positioned (closed) around pig-tail splice arrangement 100, with a portion of connector 105 projecting from one end 110 thereof and with wires 102 and 103 projecting outwardly from an opposite end 111. It will be understood that assembly 25, FIG. 5, can be as described for FIGS. 1 through 4. In FIG. 5 a portion is broken away, showing wires 102 and 103, and a portion of cap 106, embedded within sealant material 107, in an interior 108 of the assembly 25.

From FIGS. 1 through 5, it will be understood that assemblies such as assembly 25, according to the present invention, can be utilized in a variety of applications. The somewhat universal nature of such closures leads to advantage, particularly for applications in the field where it may be desirable for one type of closure to be available to suit a variety of potential applications.

THE VARIATIONS OF FIGS. 6 AND 7

An alternate embodiment of the present invention is illustrated in FIGS. 6 and 7. The embodiment of FIGS. 6 and 7 includes a closure 115 comprising a first shell section 117 and a second shell section 118. Each of shell sections 117 and 118 is generally "L" shaped, joined along ribbed hinge 120. Shell section 117 includes extension 122 and sidewall 123; and, shell section 118 analogously includes extension 125 and sidewall 126. Assembly 115 includes an interference fit locking arrangement analogous to arrangement 50, FIGS. 1-4. In particular, interlocking members 128 and 129 are depicted. The interlocking members 128 and 129 each includes a ratchet member with a plurality of elongate teeth.

A primary manner in which the arrangement of FIG. 6 differs from the arrangement 25 of FIGS. 1-5 is that each of extensions 122 and 125 has a generally convex or bowed cross-section, projecting such that when assembly 115 is closed, FIG. 7, each of the extensions 122 and 125 projects inwardly, i.e. toward sealant fields 130 and 131 respectively. The inward projection, or convex cross-section, of extensions 122 and 125 presents a resistance to expansion or outward bowing of closure 115, upon closing around wires 133 and sealant fields 130 and 131. Thus, there is resistance to certain deformation of the assembly 115 from hydraulic pressures built up within the sealant fields 130 and 131 during closure, FIG. 7. The pressures are therefore contained and directed to enhance spreading of the wires 133, and to enhance maintenance of the locking engagement between the two shell sections 117 and 118. It will be understood that assembly 115 can be utilized in association with a variety of types of junctions, including pig-tail type junctions analogous to FIG. 5, or multi-wire splices analogous to the one depicted in FIG. 1. Preferred radii of curvature for extensions 122 and 125, in cross section, are provided hereinbelow for certain embodiments.

THE VARIATION OF FIG. 8

FIG. 8 depicts yet another modification in a closure according to the present invention, from a point of view generally analogous to that shown in FIG. 6. More specifically, FIG. 8 depicts an assembly 135 including first and second "L" shaped shell sections 136 and 137 respectively, joined by longitudinal, ribbed, hinge 138.

The arrangement of FIG. 8 differs from the arrangements of FIGS. 1-5 and FIGS. 6-7 in the specific construction of the interference fit locking arrangement. In particular, shell section 137 includes an interlocking member 144 comprising a plurality of longitudinal tooth members 145; however, interlocking member 147, on shell section 136, includes only one longitudinal tooth member 148. It will be understood that as assembly 135 is closed, teeth 145 and tooth 148 will engage one another in a rachet-like manner, facilitating a locked enclosure. The purpose of FIG. 8 is to illustrate that some advantage can be obtained when only one of the interlocking members includes a plurality of longitudinal tooth members. As side member 150 is forced more deeply toward shell section 137, during closure, progressive ones of tooth members 145 will be passed, and engaged.

It will be understood that alternate arrangements to the locking mechanism of FIG. 8 may include an arrangement wherein a plurality of tooth members are oriented on shell section 136, and a single tooth member is oriented on shell section 137. Also, one tooth member on each shell section may have utility in some applications.

It will also be understood that, in general, advantage results from the arrangement shown in FIGS. 1-5, and 6-7, since more sites of locking are provided, due to the plurality of teeth on both shell sections. Thus, a more secure locking is achieved. However, the arrangement of FIG. 8, or analogs thereof, may be usable in some applications.

THE EMBODIMENTS OF FIGS. 9, 10 AND 11

As previously indicated, an embodiment of the present invention involves a non-unitary construction comprising first and second independent, but telescoping, shell sections. A preferred such embodiment is illustrated in FIGS. 9-11.

Figure 9:
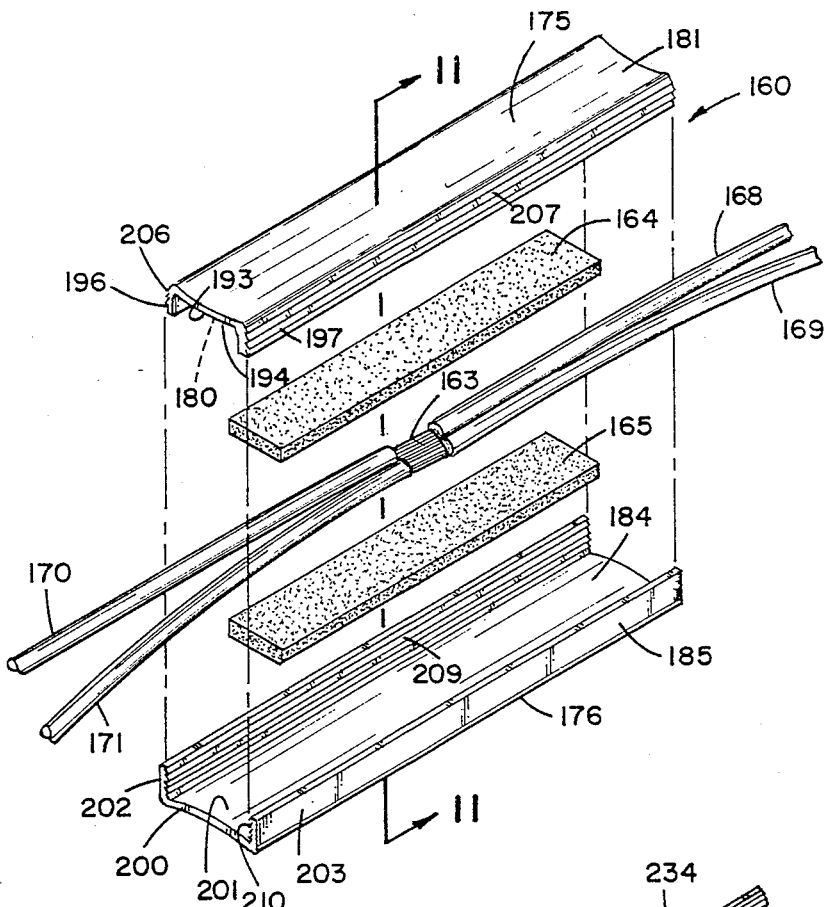
FIG. 9 is an exploded prospective view of a third alternate embodiment of the present invention, involving a two-piece closure; the arrangement of FIG. 9 being shown in association with first and second sealant fields, and a four-wire junction.

Referring to FIG. 9, an assembly 160 according to this alternate embodiment is depicted, in an exploded view. The assembly 160 is illustrated in prospective, in an environment involving a four-wire splice or junction 163, and first and second sealant fields, 164 and 165 respectively. The junction 163 is formed from a pair of wires 168 and 169 approaching from one direction, and a pair of wires 170 and 171 approaching from an opposite direction. As for the previously described embodiment, it will be understood that assembly 160 can be utilized with a variety of junction arrangements, junction 163 merely providing an example. For example, assembly 160 can be utilized with a pig-tail arrangement.

Assembly 160 comprises a first shell section 175 and a second shell section 176. The shell sections 175 and 176 are sized such that the first shell section 175 can be snugly nested within the second shell section 176; see for example FIGS. 10 and 11.

For the embodiment shown in FIGS. 9-11, shell section 175 includes inner and outer surfaces or portions 180 and 181 respectively; and, shell section 176 includes inner and outer surfaces or portions 184 and 185 respectively. As with previously described embodiments, an interference fit locking mechanism 188; FIG. 11, is oriented for operational engagement between outer surface 181, of first shell section 175, and inner surface 184, of shell section 176.

More particularly, interference fit locking means of assembly 160 comprises first interference fit locking mechanism 188, and a second interference fit locking mechanism 190, FIG. 11. For the embodiment shown, each operates between the outer surface 181 of shell section 175, and the inner surface 184 of shell section 176.

For the particular embodiment of assembly 160 shown, each of shell sections 175 and 176 has a generally block "C" shaped cross-section. More specifically, shell section 175 comprises an elongate trough member 193 having a central longitudinal surface 194 bordered by first and second opposite longitudinal sidewalls 196 and 197. Similarly, shell section 176 comprises an elongate trough member 200 having a central longitudinal surface 201 bordered on opposite sides by opposite elongate sidewalls 202 and 203. Referring to FIG. 11, for the embodiment shown a distance between internal surfaces of sidewalls 202 and 203 is just enough larger than a distance between outside surfaces of sidewalls 196 and 197 to provide for a snug nesting engagement. Preferably pair of sidewalls, 196, 197 and 202, 203, extend substantially parallel to one another. This facilitates both engagement and manufacture.

As will be understood by reference to FIGS. 9-11, the first and second interference locking mechanisms 188 and 190 of assembly 160 may each comprise interlocking members as previously described. More particularly, for the preferred embodiment each comprises rachet members including a plurality of elongate tooth portions, appropriately oriented, mounted on each sidewall. More specifically, shell section 175 includes first and second opposite rachet members 206 and 207 on opposite sidewalls 196 and 197 respectively; and, shell section 176 includes first and second opposite rachet members 209 and 210 on internal surfaces of opposite sidewalls 202 and 203 respectively.

Referring to FIG. 11 sealant field 165 is sized (in transverse dimension) such that side gaps 211 and 212 are formed along opposite sides to facilitate engagement between shell sections 175 and 176. In particular, gaps 211 and 212 are sized for snug receipt of opposite sidewalls 196 and 197 of shell section 175 therein. Thus, as shell section 175 engages shell section 176, with sealant fields 164 and 165 therebetween, the sealant fields are compressed, with resulting hydraulic forces generating a good seal around enclosed wires in the enclosed wire junction, and simultaneously generating substantial pressure against the interference locking mechanisms 188 and 190, facilitating enclosure. It will be appreciated that while gaps 211, 212 are preferred, they are not absolutely necessary to practice the full scope of the invention.

For the embodiment shown in FIGS. 9–11, each shell section longitudinal surface 194 and 201, has a substantially convex cross-section, projecting inwardly of the enclosed assembly 160, FIGS. 10 and 11. This facilitates compression of sealant fields 164 and 165, in a manner analogous to that described for the embodiment of FIGS. 6 and 7 previously. It will be understood that in some embodiments involving separate shell sections, analogous to shell sections 175 and 176, central trough members having a non-convex cross section, for example a planar cross-section, can be utilized.

The embodiment of FIGS. 9–11 is preferred in certain applications, especially those wherein automated assembly of the closure 160 is involved. In particular, it will be understood by reference to FIGS. 9–11 that long extensions of shell sections, analogous to shell sections 175 and 176, can be fed from automated assemblies involving rollers or the like, to a nesting engagement around a wire junction. Strips of materials of appropriate length to form section 175 and 176 can then be cut from long extensions, resulting in an automatically enclosed system. It will be understood that in general, for such arrangements, the strips of material from which shell sections 175 and 176 are formed can be provided with sealant fields 164 and 165 already thereon, and appropriately oriented for the nesting and sealing relationship.

Referring to FIG. 11, and comparing same to FIGS. 4 and 7, another advantage from the embodiment of FIGS. 9–11 will be understood. In particular, as shell section 175 is nested within 176, the compression on sealant fields 164 and 165 is generally symmetrically distributed across a transverse section thereof. That is, compression does not begin at one side, before the other. On the other hand, referring to the embodiments of FIGS. 4 and 7, and especially focusing attention on FIG. 4, as shell section 40 is closed over shell section 41, compression of the sealant fields 26 and 27 will first be along edges thereof in the vicinity of the hinge 69. This will tend to cause a general flow of the sealant material. The fluid motion of the sealant material 26 and 27 would be taken into account when estimating the amount of sealant material for the closure. Otherwise, some blockage or resistance to closure may occur. The potential problem is lessened somewhat, however, in the embodiment of FIGS. 9–11.

PREPARATION OF COMMERCIAL EMBODIMENTS; FIG. 12

A significant advantage to closure arrangements according to the present invention is that they can be relatively efficiently and economically mass-manufactured. For example, the construction is such that the closure arrangements can be formed from an extruded polymeric material such as a polyvinyl or polypropylene resin. More specifically, the closure arrangements may be extruded in long strips, and cut into appropriate sections for use as closures. It will be understood that all of the embodiments described in FIGS. 1–11 can be manufactured through extrusion, if desired, since all structural features are longitudinal and continuous. It is noted, however, that alternate methods of manufacture, for example molding, can be utilized.

Figure 12:
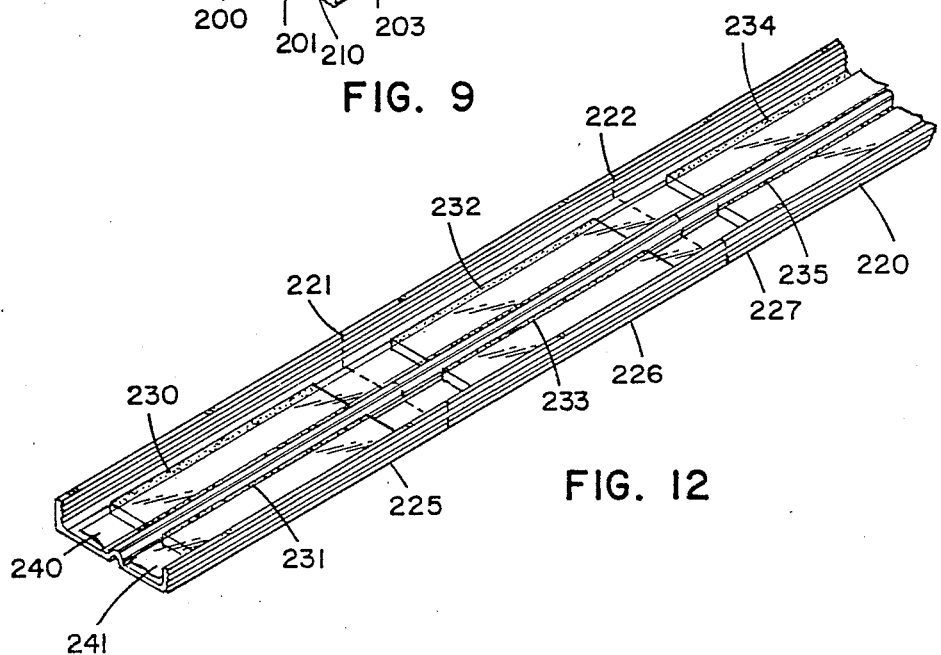
FIG. 12 is a fragmentary prospective view depicting a step of manufacture of an arrangement according to the present invention.

For an example of a convenient extrusion manufacturing process, attention is directed to FIG. 12. In FIG. 12, an embodiment generally analogous to that described with respect to FIGS. 1–5 is illustrated, as it can appear during manufacture. In FIG. 12, a fragmentary perspective view of a strip 220 of extruded plastic material having a cross-sectional shape analogous to that for the shape of closure 25, is depicted. Strip 220 of FIG. 12 is illustrated with the cut lines 221 and 222 oriented such that if the strip 220 were cut along cut lines 221 and 222, three closure assemblies, i.e. assembly 225, 226, and 227 each analogous to closure assembly 25, FIG. 1, would result. The cut lines 221 and 222 may be merely points of cutting, or they may be physically weaker, for example, thinner areas of material.

Each of assemblies 225, 226 and 227 is illustrated with a pair of sealant fields therein. More specifically, assembly 225 includes sealant fields 230 and 231; assembly 226 includes sealant fields 232 and 233; and, assembly 227 includes sealant fields 234 and 235. The sealant fields of each assembly are spaced from sealant fields of the next assembly, in the vicinity of the cut lines 221 and 222. That is, the sealant material has been laid down in each assembly to provide a space in the vicinity of the cut lines to facilitate manufacture.

First and second elongate release liners or protective liners 240 and 241 are depicted extending continuously along and over the sealant fields. It will be understood that during the manufacture process, when cutting occurs along lines 221 and 222, the liners 240 and 241 will be cut into sections, one section of each liner 240 and 241 being associated with each of the assemblies 225, 226 and 227. The liners 240 and 241 are release liners, for example of silicone coated polypropylene material or the like, which protect sealant in the various sealant fields, during manufacture and storage. Just prior to assembly use, it is foreseen that the release liners will be stripped from the sealant material, exposing same. A variety of materials may be utilized for the release liners including polymeric films or paper coated with suitable release coatings.

DIMENSIONS FOR A TYPICAL EMBODIMENT

It will be understood that a variety of dimensions may be utilized for closure arrangements according to the present invention. In general, the dimensions will depend greatly upon the size of the junctions to be enclosed. The following recited dimensions are for a typical enclosure that can be used on a variety of automotive or truck wire splices. The dimensions given are for a closed arrangement such as that depicted in FIGS. 2 and 4.

| Overall length | 4.0–6.0 cm. |
| --- | --- |
| Thickness of wall | 0.075–0.10 cm. |
| Outside height of outside wall 86 | 0.45–0.060 cm. |
| Outside height of internally received wall 81 | 0.35–0.45 cm. |
| Radius of hinge line | 0.19–0.23 cm. |
| Width of surface 80 | 0.62–0.70 cm |
| Width of surface 85 | 0.77–0.85 cm. |
| Radius of curvature of surfaces when convex (optional, FIGS. 6 and 7) | 4.75–5.25 cm. |

Again, the above recited dimensions are representational only, and are not to be interpreted as limiting. It is foreseen that in general when an arrangement using convex surfaces is involved (for example FIGS. 6 and 7), a radius of curvature of no greater than about 10 cm will be preferred.

THE SEALANT MATERIAL

A variety of sealant materials may be utilized in combination with arrangements according to, and during applications of, the present invention. Generally what is required of such sealants is that they: exhibit sufficient adhesion to substrate wire insulations to provide good seal, typically at least an adhesion value of about 125.0$_{oz.}$/inch width or about 1.4 N/mm is sufficient; exhibit a sufficiently high insulation resistance, for example about 1 $\times 10^6$ megohms is obtainable and more than sufficient; exhibit sufficiently low water absorption, for example on the order of 0.75% is obtainable and effective; and, exhibit a good adherence to metals from which wire connections may be made, for example, an adherence of about the same as the above related adherence to substrate wire insulation is generally obtainable and more than sufficient. Generally, a cone penetration value, according to ASTM-217, within the range of about 45–70 (4.5 to 7.0 mm, units of cone penetration being 0.1 mm), at 25° C. is sufficient for most typical applications. With such cone penetration values, materials used as the viscous sealant generally exhibit desirable flow and sealing characteristics, under typical pressures and temperatures for typical applications of enclosures according to the present invention. Preferably the cone penetration value is not greater than about 70 at 25° C., or the substance may too easily flow for universal application.

Adhesives or sealants usable include thick, rubber-based compounds. Preferred sealant generally comprises soft, tackified, elastomer compounds extended with oils and fillers. Typical, usable, elastomer bases for such compositions include polyisobutylene/EPDM rubber/butyl rubber mixtures. Such sealants do not readily degrade when exposed to automotive or marine environments. Further, they are not substantially adversely affected by severe vibration or extreme temperature change.

One usable sealant material comprises a mixture of the following materials by weight blended to a viscosity of 2650 to 3350 poise, at a sheer rate of 1/600 sec. and a temperature of 75° C.

| Material | Amount, PHR* |
| --- | --- |
| Polyisobutylene | 40.0 |
| EPDM rubber | 28.8 |
| Butyl rubber | 31.2 |
| Polybutene | 100.0 |
| Inorganic filler | 150.1 |
| Asphalt | 30.0 |
| Carbon black | 15.0 |
| Hydrocarbon tackifier | 50.0 |

*PHR = parts per hundred Rubber Component. The term "Rubber Component" is meant to refer to the total of the polyisobutylene, EPDM and butyl rubber components.

It is to be understood that while certain embodiments of the present invention have been illustrated and described, the invention is not to be interpreted as limited to specific forms, arrangement of parts, or methods herein described and shown.

We claim:

1. A sealant/closure combination for use in providing an environmental seal about a wire junction; said combination comprising:
   (a) a closable shell defining, when closed, an internal wire junction receiving chamber having first and second, opposite, open ends; said shell including first and second shell sections joined to one another along a hinge;
      (i) said first shell section comprising an elongate trough member having first and second opposite sidewalls with a central, internal, convex longitudinal surface extending therebetween and integral therewith; said first shell section central convex longitudinal surface having a radius of curvature of between about 4.75 and 5.25 cm; said first shell section having internal and external wall portions;
      (ii) said second shell section comprising an elongate trough member having first and second opposite sidewalls with a central, internal, convex, longitudinal surface extending therebetween and integral therewith; said second shell section central, convex, longitudinal surface having a radius of curvature of between about 4.75 and 5.25 cm; said second shell section having internal and external wall portions;
      (iii) said first shell section first sidewall and said second shell section first sidewall being joined to one another along said hinge;
   (b) an interference fit locking arrangement including first and second interlocking members; said first interlocking member being oriented on said first shell section external wall portion and said second interlocking member being oriented on said second shell section internal wall portion;
      (i) said first and second interlocking members respectively including a first elongate longitudinal ratchet member and a second elongate longitudinal ratchet member; said first and second elongate longitudinal ratchet members being selectively engageable with one another to retain said shell in a closed orientation;
      (ii) said first elongate ratchet member including a plurality of longitudinal ridges and said second ratchet member including a plurality of longitudinal ridges; said first ratchet member longitudinal ridges being selectively engageable with said second ratchet member longitudinal ridges;

(c) a field of sealant material positioned on said first shell section central internal longitudinal surface and oriented in complete extension between said first shell section first and second, opposite, sidewalls; and (d) a field of sealant material positioned on said second shell section central internal longitudinal surface and oriented in extension from said second shell section first sidewall partially across said second shell section central longitudinal surface to terminate leaving a gap adjacent to said second shell section second sidewall; said gap being sized for partial receipt of said first shell section second sidewall therein, during closure.

2. A sealant/closure combination according to claim 1 wherein said hinge is a longitudinally ribbed hinge.

3. A sealant/closure combination for use in providing an environmental seal about a wire junction; said combination comprising:
 (a) a closable shell defining, when closed, an internal wire junction receiving chamber having first and second, opposite, open ends; said shell comprising first and second, separable, shell sections;
   (i) said first shell section comprising an elongate trough member having first and second opposite sidewalls with a central, internal, convex longitudinal surface extending therebetween and integral therewith; said first shell section central convex longitudinal surface having a radius of curvature of between about 4.75 and 5.25 cm; said first shell section having internal and external wall portions;
   (ii) said second shell section comprising an elongate trough member having first and second opposite sidewalls with a central, internal, convex, longitudinal surface extending therebetween and internal therewith; said second shell section central, convex, longitudinal surface having a radius of curvature of between about 4.75 and 5.25 cm; said second shell section having internal and external wall portions;
 (b) a first interference fit locking arrangement including first and second interlocking members; said first interlocking member being oriented on an external wall portion of said first shell section first sidewall and said second interlocking member being oriented on an internal wall portion of said second shell section first sidewall;
   (i) said first and second interlocking members respectively including a first elongate longitudinal ratchet member and a second elongate longitudinal ratchet member; said first and second elongate longitudinal ratchet members being selectively engageable with one another to retain said shell in a closed orientation;
   (ii) said first elongate ratchet member including a plurality of longitudinal ridges and said second ratchet member including a plurality of longitudinal ridges; said first ratchet member longitudinal ridges being selectively engageable with said second ratchet member longitudinal ridges;
 (c) a second interference fit locking arrangement including third and fourth interlocking members; said third interlocking member being oriented on an external wall portion of said first shell section second sidewall and said fourth interlocking member being oriented on an internal wall portion of said second shell section second sidewall;
   (i) said third and fourth interlocking members respectively including a third elongate longitudinal ratchet member and a fourth elongate longitudinal ratchet member; said third and fourth elongate longitudinal ratchet members being selectively engageable with one another to retain said shell in a closed orientation;
   (ii) said third elongate ratchet member including a plurality of longitudinal ridges and said fourth ratchet member including a plurality of longitudinal ridges; said third ratchet member longitudinal ridges being selectively engageable with said fourth ratchet member longitudinal ridges;
 (d) a field of sealant material positioned on said first shell section central internal longitudinal surface and oriented in compete extension between said first shell section first and second, opposite, sidewalls; and
 (e) a field of sealant material positioned on said second shell section central internal longitudinal surface and further oriented to leave: a first gap between a first edge of the field of sealant and said second shell section first sidewall, for receipt of a portion of said first shell section first sidewall therein, during closure; and, a second gap between a second edge of the field of sealant and said second shell section second sidewall, for receipt of a portion of said first shell section second sidewall therein, during closure.

* * * * *

UNITED STATES PATENT AND TRADEMARK OFFICE
CERTIFICATE OF CORRECTION

PATENT NO.     :     4,963,700

DATED          :     October 16, 1990

INVENTOR(S)    :     Arnold T. Olsen

It is certified that error appears in the above-identified patent and that said Letters Patent is hereby corrected as shown below:

Column 1, Line 22, "may a" should read --may be of a--.

Column 3, Line 59, "rachet" should read --ratchet--.

Column 7, Line 19, "rachet" should read --ratchet--.

Column 7, Line 38, "rachet" should read --ratchet--.

Column 7, Line 40, "rachet" should read --ratchet--.

Column 7, Line 41, "rachet" should read --ratchet--.

Column 7, Line 45, "rachet-type" should read --ratchet-type--.

Column 7, Line 48, "rachet" should read --ratchet--.

UNITED STATES PATENT AND TRADEMARK OFFICE
CERTIFICATE OF CORRECTION

PATENT NO.    :    4,963,700

DATED    :    October 16, 1990

INVENTOR(S)    :    Arnold T. Olsen

It is certified that error appears in the above-identified patent and that said Letters Patent is hereby corrected as shown below:

Column 9, Line 51, "rachet-like" should read --ratchet-like--.

Column 10, Line 61, "Preferably pair" should read --preferably each pair--.

Column 11, Line 1, "rachet" should read --ratchet--.

Column 11, Line 4, "rachet" should read --ratchet--.

Column 11, Line 9, "FIG. 11 sealant" should read --FIG. 11, sealant--.

Column 11, Line 11, "sides to" should read --sides thereof, to--.

UNITED STATES PATENT AND TRADEMARK OFFICE
CERTIFICATE OF CORRECTION

PATENT NO. : 4,963,700

DATED : October 16, 1990

INVENTOR(S) : Arnold T. Olsen

It is certified that error appears in the above-identified patent and that said Letters Patent is hereby corrected as shown below:

Column 11, Line 44, "form section" should read --form shell section--.

Column 16, Line 36, "compete" should read --complete--.

Column 16, Line 48, "first" should read --second--.

Column 16, Line 50, paragraph f should read --means for closing said shell with said first shell section first and second sidewalls received within said first and second gaps respectively, and adjacent and abutting said second shell section first and second sidewalls, respectively, during closure--.

Signed and Sealed this

Nineteenth Day of October, 1993

Attest:

BRUCE LEHMAN

Attesting Officer

Commissioner of Patents and Trademarks